(12) United States Patent
Anderson et al.

(10) Patent No.: US 10,688,892 B2
(45) Date of Patent: Jun. 23, 2020

(54) CHILD SAFETY SEAT

(71) Applicant: Wonderland Switzerland AG, Steinhausen (CH)

(72) Inventors: Robert Scott Anderson, Narvon, PA (US); James M. F. Hutchinson, Mohnton, PA (US); Clyde V. Harmes, Mohnton, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 91 days.

(21) Appl. No.: 15/921,911

(22) Filed: Mar. 15, 2018

(65) Prior Publication Data

US 2018/0264977 A1 Sep. 20, 2018

Related U.S. Application Data

(60) Provisional application No. 62/473,299, filed on Mar. 17, 2017.

(51) Int. Cl.
*B60N 2/28* (2006.01)

(52) U.S. Cl.
CPC ........... *B60N 2/2869* (2013.01); *B60N 2/286* (2013.01); *B60N 2/2821* (2013.01);
(Continued)

(58) Field of Classification Search
CPC .. B60N 2/2869; B60N 2/2875; B60N 2/2821; B60N 2/2878; B60N 2/286; B60N 2/2863
See application file for complete search history.

(56) References Cited

U.S. PATENT DOCUMENTS

| 4,971,392 A * | 11/1990 | Young | B60N 2/2821 297/256.12 |
| 6,241,314 B1 * | 6/2001 | Pufall | B60N 2/2821 297/256.12 |

(Continued)

FOREIGN PATENT DOCUMENTS

| AU | 2011200416 C1 | 8/2011 |
| EP | 1110807 A1 | 6/2001 |

(Continued)

OTHER PUBLICATIONS

Search and Examination Report dated Sep. 18, 2018 from co-pending GB Patent Application No. 1804145.9.

*Primary Examiner* — David R Dunn
*Assistant Examiner* — Tania Abraham
(74) *Attorney, Agent, or Firm* — NZ Carr Law Office, PLLC (57) ABSTRACT

A child safety seat includes a support base having a stop, a sliding carriage, a rotary platform having a follower part, and a child seat. The sliding carriage is slidable relative to the support base between a retracted and an extended position, and the child seat and the rotary platform are rotatable together relative to the sliding carriage and the support base between a forward and a rearward facing position. While the sliding carriage is in a position other than the retracted position, a rotational movement of the child seat and the rotary platform is limited by a contact between the follower part and the stop that keeps the child seat and the rotary platform apart from the forward facing position, and the stop is located outside a travel path of the follower part when the sliding carriage is in the retracted position for rotation of the rotary platform to the forward facing position.

20 Claims, 10 Drawing Sheets

(52) U.S. Cl.
CPC ......... *B60N 2/2863* (2013.01); *B60N 2/2875* (2013.01); *B60N 2/2878* (2013.01)

(56) References Cited

U.S. PATENT DOCUMENTS

| | | | | |
|---|---|---|---|---|
| 6,773,065 | B1* | 8/2004 | Stamper | A47D 5/006 |
| | | | | 297/250.1 |
| 6,793,283 | B1* | 9/2004 | Sipos | B60N 2/062 |
| | | | | 297/256.12 |
| 7,073,859 | B1* | 7/2006 | Wilson | B60N 2/0232 |
| | | | | 297/250.1 |
| 7,753,444 | B2* | 7/2010 | Vallentin | B60N 2/2821 |
| | | | | 297/256.12 |
| 9,090,182 | B2* | 7/2015 | Rabeony | B60N 2/286 |
| 2002/0145319 | A1 | 10/2002 | Tsugimatsu et al. | |
| 2008/0054695 | A1 | 3/2008 | Lhomme et al. | |
| 2008/0211279 | A1* | 9/2008 | Pesach | B60N 2/062 |
| | | | | 297/256.12 |
| 2008/0224516 | A1* | 9/2008 | Vegt | B60N 2/2824 |
| | | | | 297/256.16 |
| 2011/0109138 | A1 | 5/2011 | Inoue et al. | |
| 2012/0280540 | A1* | 11/2012 | Pedraza | B60N 2/2806 |
| | | | | 297/148 |
| 2015/0336481 | A1 | 11/2015 | Horsfall | |

FOREIGN PATENT DOCUMENTS

| | | | |
|---|---|---|---|
| FR | 2930485 | A1 | 10/2009 |
| GB | 2425463 | A | 1/2006 |
| GB | 2424921 | A | 10/2006 |
| WO | 2015025432 | A1 | 2/2015 |
| WO | 2015027275 | A1 | 3/2015 |

* cited by examiner

CHILD SAFETY SEAT

CROSS-REFERENCE TO RELATED APPLICATION(S)

This Patent Application claims priority to U.S. Provisional Patent Application No. 62/473,299 filed on Mar. 17, 2017, the disclosure of which is incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., child's head and torso). Accordingly, safety experts and car seat manufacturers usually recommend to seat children in a vehicle in a rear facing configuration until the age of 2 years old. As the child grows older, the child safety seat then may be installed in a forward facing configuration.

Some child safety seat currently available on the market may include a child seat that can be rotated for adjustment between the rearward facing position and the forward facing position, and further allow recline adjustment to offer a comfortable sitting environment. However, the added flexibility of adjustment may induce improper installation of the child safety seat on a vehicle seat.

Therefore, there is a need for an improved child safety seat that allows flexible adjustment, and can address at least the foregoing issues.

SUMMARY

The present application describes a child safety seat that can offer increased flexibility of adjustment, and is safer in use. The child safety seat includes a support base, a sliding carriage, a rotary platform, and a child seat disposed on the rotary platform. The support base is suitable for placement on a vehicle seat, and has a stop. The sliding carriage is connected with the support base, and is slidable relative to the support base between a retracted position and an extended position. The rotary platform is pivotally connected with the sliding carriage, wherein the child seat and the rotary platform are rotatable together relative to the sliding carriage and the support base between a forward facing position and a rearward facing position, and the child seat, the rotary platform and the sliding carriage are slidable together relative to the support base. Moreover, the child safety seat includes a follower part coupled to the rotary platform so that the follower part is movable along with the rotary platform, wherein a rotational movement of the child seat and the rotary platform occurring while the sliding carriage is located in a position other than the retracted position is limited by a contact between the follower part and the stop that keeps the child seat and the rotary platform apart from the forward facing position, and the stop is located substantially outside a travel path of the follower part when the sliding carriage is in the retracted position to allow rotation of the child seat and the rotary platform to the forward facing position.

DETAILED DESCRIPTION OF THE EMBODIMENTS

Reference is made to FIGS. 1-7 illustrating an embodiment of a child safety seat 100. Referring to FIGS. 1-7, the child safety seat 100 can include a support base 102, a sliding carriage 104, a rotary platform 106, and a child seat 108 disposed on the rotary platform 106. The support base 102 is suitable for placement on a vehicle seat to provide stable support for the child safety seat 100. According to an example of construction, the support base 102 can include a bearing portion 110 and an anchoring portion 112 connected with each other. The bearing portion 110 may include a guide track 114, and can be fixedly connected with the anchoring portion 112. The anchoring portion 112 can include a rigid shell 116, and can project above the bearing portion 110 at a rear of the bearing portion 110. The child safety seat 100 can be installed on a vehicle seat with the anchoring portion 112 abutting against a seatback of the vehicle seat and rising generally along the seatback of the vehicle seat.

Figure 1:
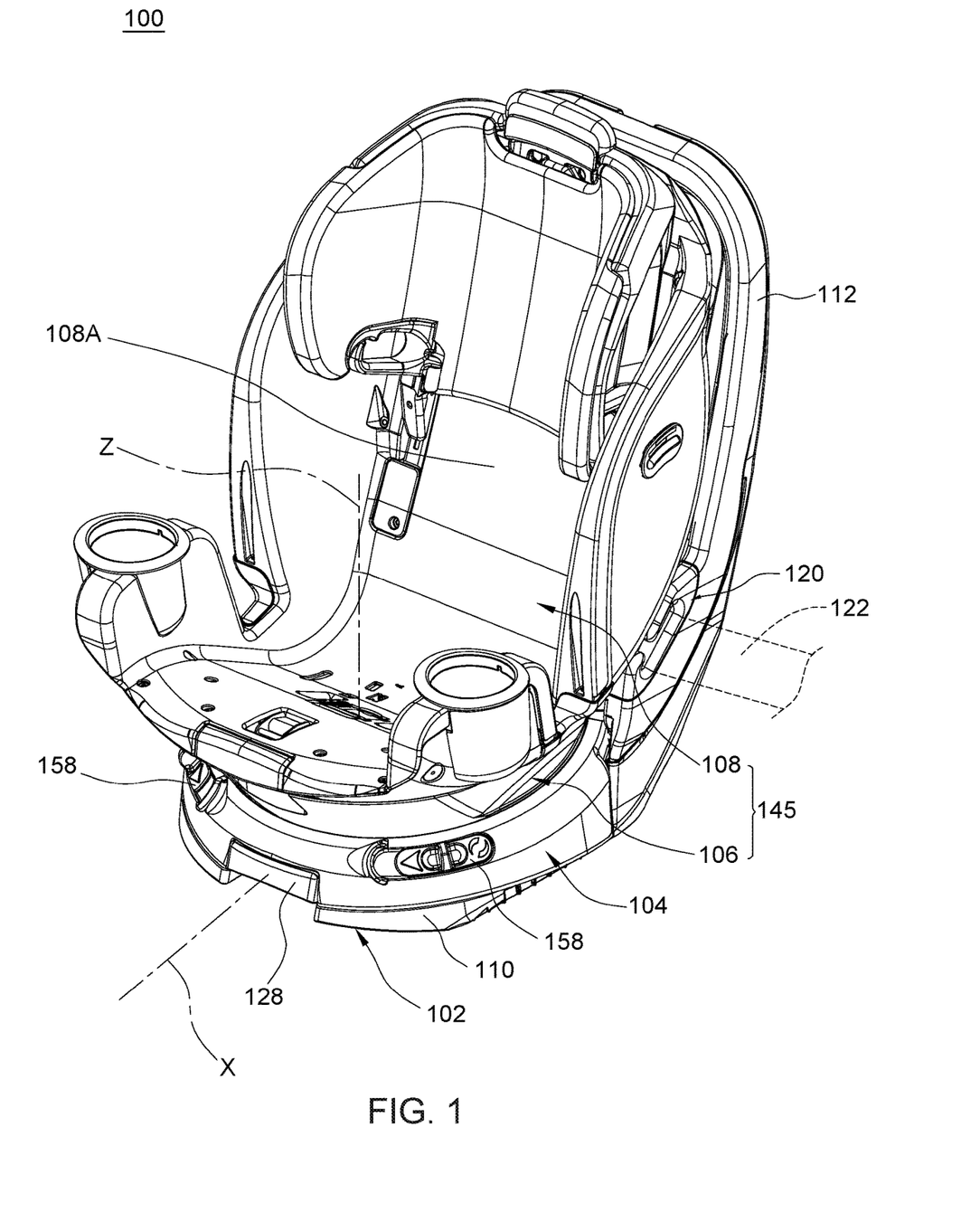
FIG. 1 is a perspective view illustrating an embodiment of a child safety seat including a support base, a sliding carriage, a rotary platform and a child seat.
Figure 2:
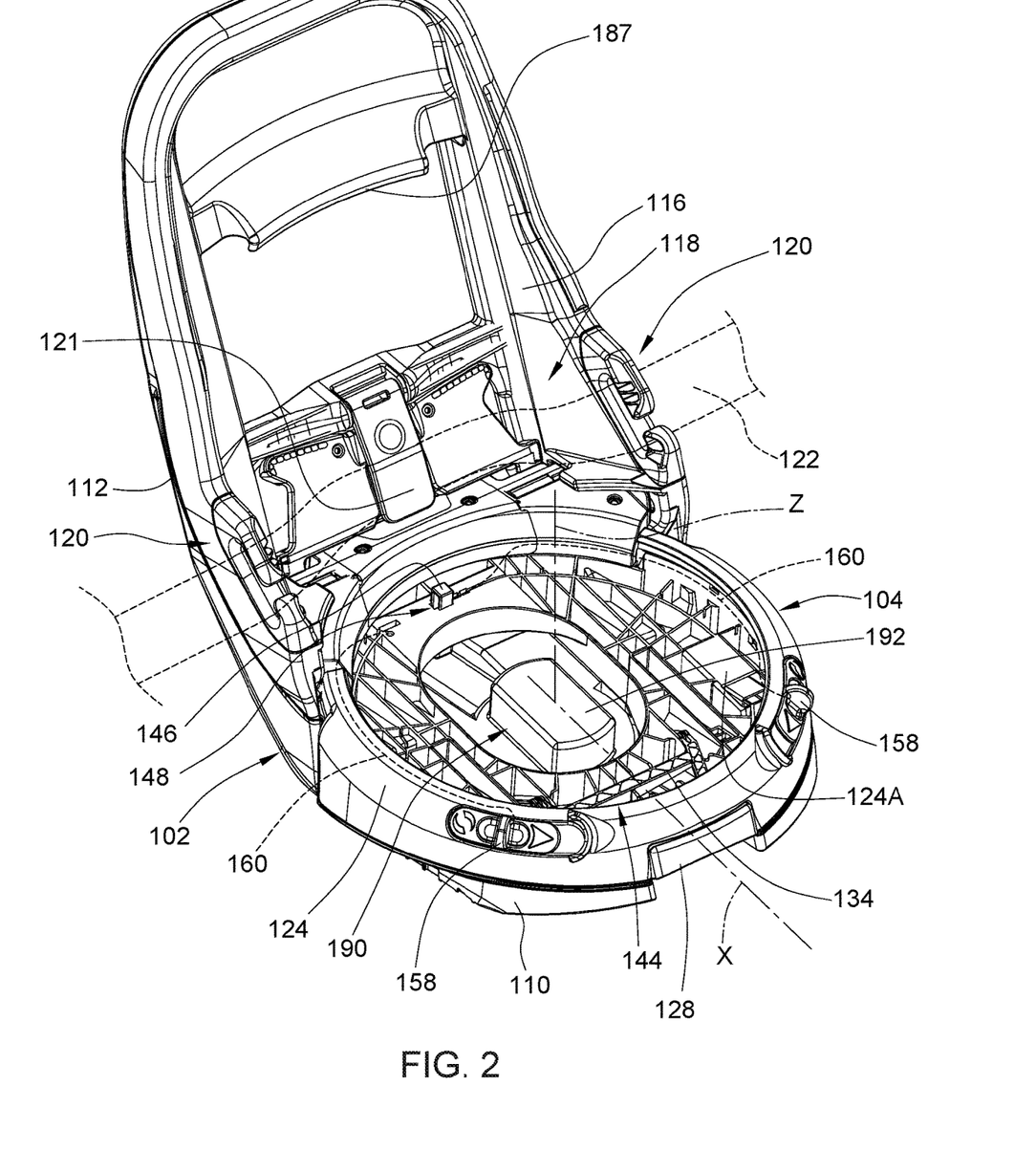
FIG. 2 is a perspective view illustrating the sliding carriage assembled with the support base and omitting the rotary platform and the child seat.

Referring to FIGS. 1 and 2, the anchoring portion 112 can define a belt path 118 for passage of a fastening belt to attach the child safety seat 100 on a vehicle seat. For example, the belt path 118 can be comprised of two guide slots 120 formed through a left and a right sidewall of the anchoring portion 112, and can extend transversally across the anchoring portion 112. The two guide slots 120 may be disposed above and at a rear of the sliding carriage 104. Moreover, the anchoring portion 112 may be provided with a belt clamp 121 disposed between the two guide slots 120. A fastening belt 122 (shown with phantom lines in FIGS. 1 and 2), which may be a vehicle safety belt or a latch belt, can be disposed transversally through the two guide slots 120 and stretch above the bearing portion 110 for attaching the support base 102 on a vehicle seat. The installed fastening belt 122 may be tensioned and clamped by the belt clamp 121.

Figure 3:
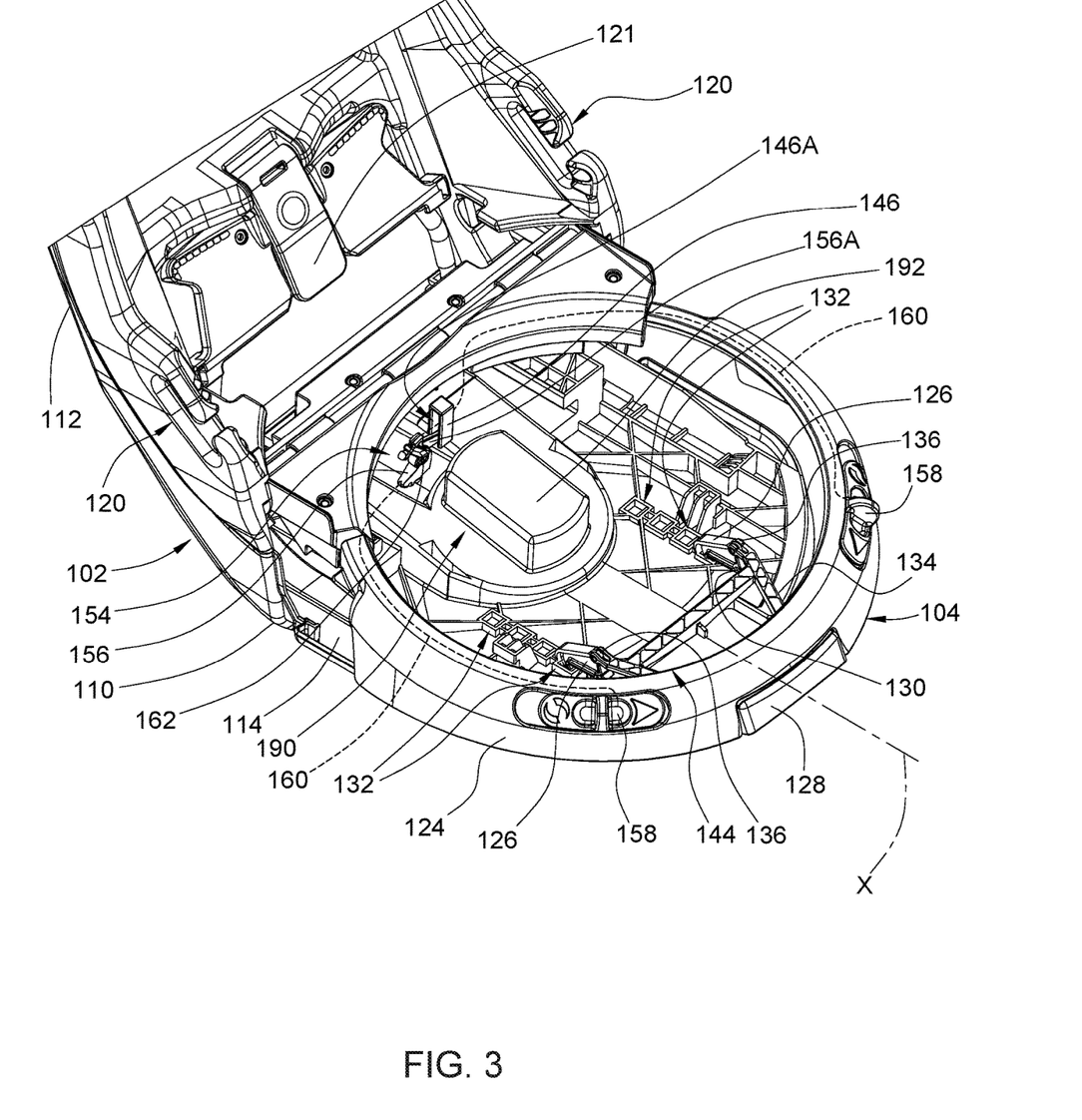
FIG. 3 is an enlarged perspective view illustrating the sliding carriage assembled with the support base but omitting an inner panel of the sliding carriage.

Referring to FIGS. 1-3, the sliding carriage 104 is connected with the bearing portion 110 of the support base 102, and can slide back and forth along a lengthwise axis X relative to the support base 102. Since both the rotary platform 106 and the child seat 108 are carried by the sliding carriage 104, the rotary platform 106, the child seat 108 and the sliding carriage 104 are slidable together along the lengthwise axis X relative to the support base 102. According to an example of construction, the sliding carriage 104 may include a rigid housing 124, which may include an inner panel 124A. The inner panel 124A of the housing 124 is shown in FIG. 2, but omitted in FIG. 3. The housing 124 can be slidably assembled with the guide track 114 of the bearing portion 110, so that the sliding carriage 104 can slide on the bearing portion 110 toward and away from the anchoring portion 112 for adjustment between multiple axial positions. In particular, the sliding carriage 104 may slide relative to the support base 102 between at least a retracted position and an extended position, the sliding carriage 104 being spaced apart from the anchoring portion 112 by a first distance in the retracted position and by a second distance greater than the first distance in the extended position. The sliding carriage 104 can be in the extended position when the child safety seat 100 is installed on a vehicle seat in a rearward facing position, and in the retracted position when the child safety seat 100 is installed on a vehicle seat in a forward facing position.

Referring to FIGS. 2 and 3, the sliding carriage 104 can carry a latch 126 for slidably locking the sliding carriage 104 with respect to the support base 102, and a release actuator 128 operatively connected with the latch 126. For example, the latch 126 can engage with the bearing portion 110 of the support base 102 for slidably locking the sliding carriage 104 with respect to the support base 102, and can disengage from the support base 102 for sliding adjustment of the sliding carriage 104 relative to the support base 102. According to an example of construction, the latch 126 may be pivotally assembled with the inner panel 124A of the housing 124 via a pivot connection 130, and is rotatable downward and upward to engage with and disengage from any of a plurality of locking openings 132 (better shown in FIG. 3) provided on the bearing portion 110 of the support base 102. The locking openings 132 can be associated with different axial positions of the sliding carriage 104 along the lengthwise axis X.

The release actuator 128 is operable to cause the latch 126 to disengage from the bearing portion 110 of the support base 102 for sliding adjustment of the sliding carriage 104 relative to the support base 102. According to an example of construction, the release actuator 128 may be pivotally or slidably connected with the housing 124 of the sliding carriage 104, and may be exposed at a front thereof for operation. The release actuator 128 can be connected with the latch 126 via a linking part 134. For example, the linking part 134 may have one end pivotally connected with the latch 126 via a pivot connection 136, and another end coupled to the release actuator 128. The release actuator 128 is thereby operable to urge the latch 126 in rotation for disengaging from the bearing portion 110 of the support base 102.

According to an example of implementation, two of the same latch 126 described previously may be provided for locking the sliding carriage 104 with the support base 102, and the release actuator 128 may be connected with the two latches 126 via the same linking part 134, as illustrated in FIG. 3.

Referring to FIGS. 1-4, the rotary platform 106 is pivotally connected with the sliding carriage 104 about a pivot axis Z. The pivot axis Z vertically passes through the rotary platform 106, and can extend along a vertical direction or slightly inclined relative to the vertical direction (e.g., at an angle between about 10 and about 15 degrees relative to the vertical direction, such as 13 degrees). According to an example of construction, the rotary platform 106 can include a base plate 140 having a generally circular shape, and two rigid beams 142 parallel to each other that are fixedly connected with the base plate 140 and project upward from the base plate 140. The rotary platform 106 can be assembled with the sliding carriage 104 by pivotally fitting the base plate 140 through an opening 144 of a generally circular shape provided in the housing 124 of the sliding carriage 104.

The rotary platform 106 and the child seat 108 thereon can rotate together as a seat unit 145 relative to the sliding carriage 104 and the support base 102 between a plurality of positions. In particular, the rotary platform 106 and the child seat 108 are rotatable together relative to the sliding carriage 104 and the support base 102 between a rearward facing position and a forward facing position. In the rearward facing position, a front of the child seat 108 can be positioned adjacent to the anchoring portion 112, such that a child sitting on the child seat 108 would face the anchoring portion 112. The child safety seat 100 may be installed on a vehicle seat with the rotary platform 106 and the child seat 108 in the rearward facing position so as to receive a child of a smaller size facing a rear of the vehicle.

In the forward facing position, a backrest portion 108A of the child seat 108 can be positioned adjacent to the anchoring portion 112, such that a child sitting on the child seat 108 would face a side opposite to that of the anchoring portion 112. The child safety seat 100 may be installed on a vehicle seat with the rotary platform 106 and the child seat 108 in the forward facing position so as to receive a child of a larger size facing a front of the vehicle.

Referring to FIGS. 2-5, the sliding carriage 104 can carry a latch 146 for rotationally locking the rotary platform 106 and the child seat 108 with respect to the sliding carriage 104. The latch 146 can engage with the rotary platform 106 for rotationally locking the rotary platform 106 and the child seat 108 in any of the forward facing position and the rearward facing position, and can disengage from the rotary platform 106 for rotation of the rotary platform 106 and the child seat 108 relative to the sliding carriage 104 and the support base 102. According to an example of construction, the latch 146 may have an elongate shape, and may be slidably assembled with the housing 124 of the sliding carriage 104. More specifically, the latch 146 may be assembled in a guide slot 148 provided in the inner panel 124A of the housing 124 for sliding substantially vertically. The latch 146 can thereby slide upward to engage with any of two locking holes 150A and 150B provided in the base plate 140 at two diametrically opposite positions relative to the pivot axis Z of the rotary platform 106, and can slide downward to disengage from any of the two locking holes 150A and 150B. The latch 146 may engage with the locking hole 150A to lock the rotary platform 106 and the child seat 108 in the rearward facing position, and engage with the locking hole 150B to lock the rotary platform 106 and the child seat 108 in the forward facing position.

Figure 5:
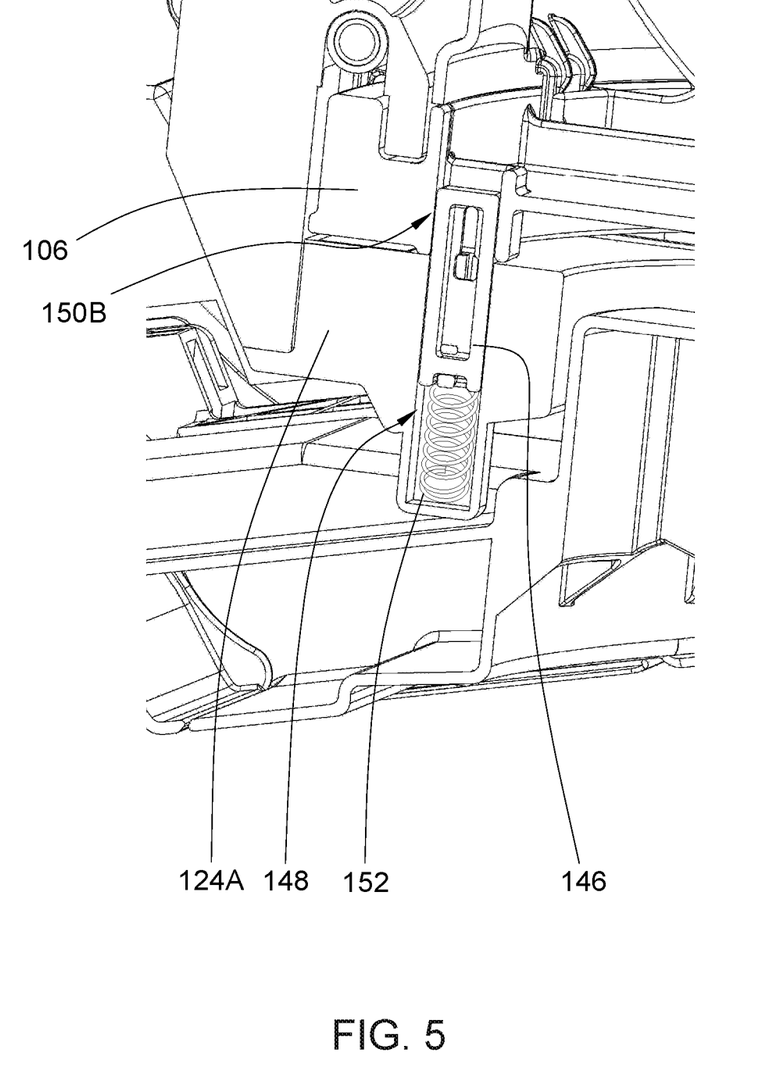
FIG. 5 is a cross-sectional view illustrating the assembly of a latch carried by the sliding carriage for rotationally locking the rotary platform on the sliding carriage.

Referring to FIG. 5, the latch 146 can be connected with a spring 152. For example, the spring 152 can be disposed in the guide slot 148, and can have two opposite ends respectively connected with the latch 146 and the housing 124 of the sliding carriage 104. The spring 152 can bias the latch 146 for engagement with the rotary platform 106.

Referring to FIGS. 2 and 3, the sliding carriage 104 can further include a release actuation mechanism 154 coupled to the latch 146. According to an embodiment, the release actuation mechanism 154 can include a driving member 156, a release actuator 158 and a cable 160 (shown with phantom lines in FIGS. 2 and 3). The driving member 156 may be pivotally connected with the housing 124 of the sliding carriage 104 via a pivot connection 162, and may have an end 156A connected with the latch 146. For example, the latch 146 can have a slot 146A, and the end 156A of the driving member 156 may be in sliding contact with the slot 146A of the latch 146.

The release actuator 158 is at least partially exposed for operation, and can be slidably assembled with the housing 124 of the sliding carriage 104. For example, the release actuator 158 may be assembled with the housing 124 of the sliding carriage 104 for generally horizontal movements. Two opposite ends of the cable 160 can be respectively attached to the release actuator 158 and the driving member 156. The release actuator 158 is thereby operable to pull on the cable 160, which in turn draws the driving member 156 in rotation and urges the latch 146 to disengage from the rotary platform 106.

According to an embodiment, two of the aforementioned release actuator 158 may be provided for facilitating release operation, as illustrated in FIGS. 2 and 3. The two release actuators 158 may be disposed symmetrically at a left and a right side of the release actuator 128, and can be respectively connected with the driving member 156 via two separate cables 160. Accordingly, each of the two release actuators 158 can be independently operated to urge the latch 146 to disengage from the rotary platform 106.

Figure 4:
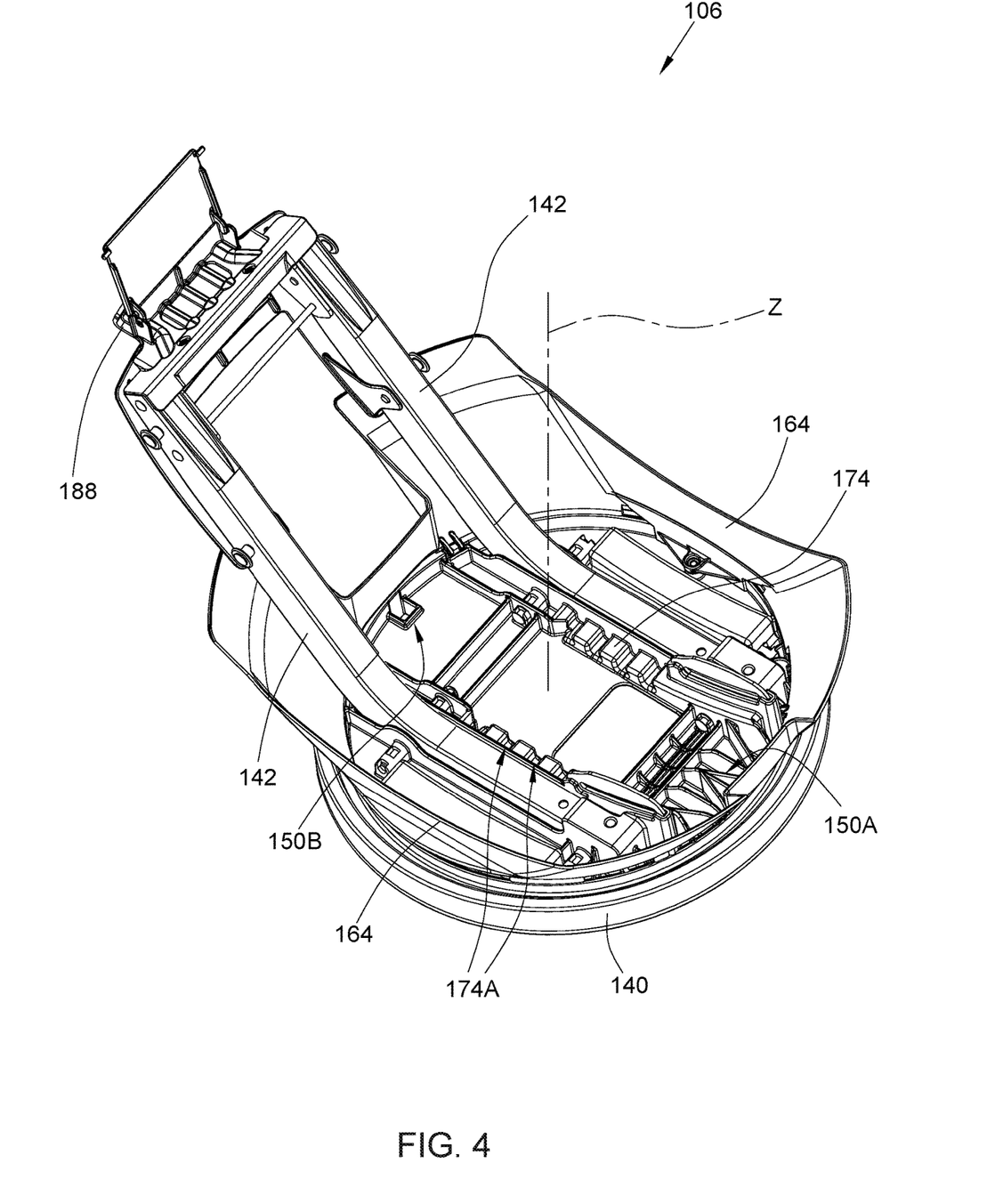
FIG. 4 is a perspective view illustrating the rotary platform alone.

Referring to FIGS. 1 and 4, the child seat 108 can have an interior adapted to receive a child, and may be slidably connected with the rotary platform 106 for back and forth movement. For example, the rotary platform 106 can include a left and a right sidewall 164 on which the child seat 108 can be slidably supported. Accordingly, the child seat 108 can slide relative to the rotary platform 106 and the support base 102 for recline adjustment independently from the rotational adjustment about the pivot axis Z and the sliding adjustment along the lengthwise axis X described previously. The recline adjustment may be conducted while the child seat 108 is in the forward or rearward facing position.

Figure 7:
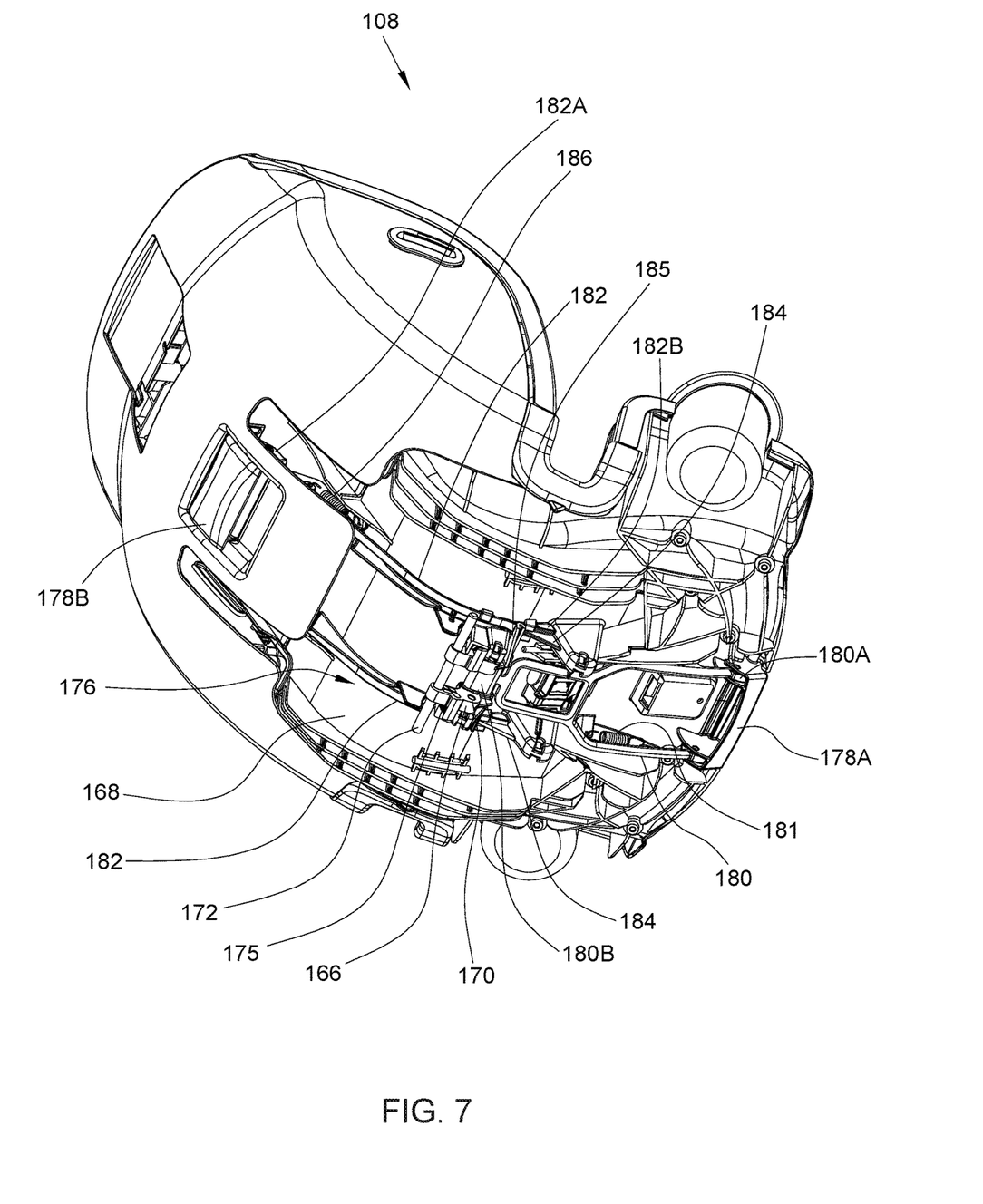
FIG. 7 is a perspective view illustrating some construction details of the child seat.

Referring to FIGS. 4 and 7, the child seat 108 can include a recline lock 166 movable between a locking and an unlocking state. The recline lock 166 can be engaged with the rotary platform 106 in the locking state for locking the child seat 108 in position with respect to the rotary platform 106, and can be disengaged from the rotary platform 106 in the unlocking state for recline adjustment of the child seat 108 relative to the rotary platform 106. According to an example of construction, the recline lock 166 may be pivotally connected with a shell body 168 of the child seat 108 about a pivot connection 170, and can include a transversal rod 172 eccentric from the pivot connection 170. The recline lock 166 is rotatable relative to the shell body 168 between the locking state where the transversal rod 172 can engage with any of multiple grooves 174A provided on a rack 174 fixedly connected with the rotary platform 106, and the unlocking state where the transversal rod 172 is disengaged from the rack 174. Moreover, the recline lock 166 may be connected with a spring 175 operable to bias the recline lock 166 toward the locking state. For example, the spring 175 may have two opposite ends respectively connected with the recline lock 166 and the shell body 168.

Referring to FIG. 7, the child seat 108 can further include a release mechanism 176 operable to urge the recline lock 166 to move from the locking state to the unlocking state. The release mechanism 176 can include two release actuators 178A and 178B respectively exposed at a front and a rear of the child seat 108 and operatively connected with the recline lock 166, each of the two release actuators 178A and 178B being independently operable to cause the recline lock 166 to rotate from the locking state to the unlocking state.

The release actuator 178A can be pivotally connected with the shell body 168 of the child seat 108, and can be connected with the recline lock 166 via a linking part 180. The linking part 180 can be a rigid part having one end 180A pivotally connected with the release actuator 178A, and another opposite end 180B slidably connected with the recline lock 166. For example, the end 180B of the linking part 180 may include an elongate slot, and the recline lock 166 may include a pin guided for sliding along the elongate slot. With this assembly, the release actuator 178A is operable to displace the linking part 180 which in turn urges the recline lock 166 in rotation for unlocking the child seat 108. A spring 181 may be provided to apply a biasing force on the linking part 180 that facilitates its return to a neutral position when the release actuator 178A is not operated. The spring 181 may have two opposite ends respectively connected with the linking part 180 and the shell body 168 of the child seat 108.

The release actuator 178B may be pivotally connected with the shell body 168 of the child seat 108, and can be connected with the recline lock 166 via two linking parts 182. The two linking parts 182 can have a same construction, and can be disposed generally parallel to each other. Each linking part 182 can have an elongate shape including one end 182A attached to the release actuator 178B, and another opposite end 182B having a ramp 184 disposed adjacent to the recline lock 166. In particular, the ramp 184 can be adjacent to a lateral protrusion 185 fixedly connected with the recline lock 166. With this assembly, the release actuator 178B is operable to draw each linking part 182 in movement, which in turn urges the recline lock 166 to rotate to the unlocking state via a sliding contact between the ramp 184 and the lateral protrusion 185 of the recline lock 166. A spring 186 may be provided to apply a biasing force on the linking part 182 that facilitates its return to a neutral position when the release actuator 178B is not operated. The spring 186 may have two opposite ends respectively connected with the linking part 182 and the shell body 168 of the child seat 108.

Referring to FIGS. 1, 2 and 4, the anchoring portion 112 can include a flange portion 187 disposed above the bearing portion 110. The flange portion 187 may be fixedly connected with the anchoring portion 112. Examples of materials for the flange portion 187 can include, without limitation, steel, rigid plastics, and the like. The flange portion 187 can have a curved shape that extends transversally from a left to a right side of the anchoring portion 112. For example, the curved shape of the flange portion 1867 may have a center of curvature adjacent to the pivot axis Z of the rotary platform 106.

When the sliding carriage 104 is in the retracted position and the seat unit 145 comprised of the rotary platform 106 and the child seat 108 is in the forward facing position, the seat unit 145 can be engaged with an underside of the flange portion 187 which is located adjacent to a shoulder support region of the child seat 108. When car collision occurs, the engagement between the seat unit 145 and the flange portion 187 can facilitate transfer of collision energy from the seat unit 145 through the support base 102 to a vehicle seat. Accordingly, the child safety seat 100 can be safer in use. When the seat unit 145 is turned to the rearward facing position, the seat unit 145 can be disengaged from the flange portion 187.

Referring to FIGS. 1, 2 and 4, a flange portion 188 may be provided on the seat unit 145 to facilitate the engagement of the seat unit 145 with the flange portion 186 of the anchoring portion 112. For example, the flange portion 188 may be fixedly connected with the rotary platform 106 of the seat unit 145. The flange portion 188 may be disposed above the base plate 140, and can protrude at a rear of the rotary platform 106, as shown in FIG. 4. Moreover, a cross-section of the flange portion 187 on the anchoring portion 112 can have a hook shape, and a cross-section of the flange portion 188 can have a corresponding hook shape that can complementarily mate with the hook shape of the flange portion 187. The engagement between hook shapes can transmit horizontal and vertical displacements of the seat unit 145 induced by car collision to the support base 102.

Since the child safety seat 100 can provide multiple degrees of adjustments (including sliding adjustment of the sliding carriage 104, and rotational adjustment of the rotary platform 106), it may be desirable to have a safety mechanism that can prevent erroneous configuration of the child safety seat 100 when it is installed on a vehicle seat. For example, the sliding carriage 104 would need to be in the retracted position for proper engagement of the seat unit 145 with the flange portion 187 of the anchoring portion 112 when the child safety seat 100 is to be installed in the forward facing position. Accordingly, a safety mechanism 190 may be provided to ensure proper configuration of the child safety seat 100 for installation in the forward facing position on a vehicle seat.

Figure 6:
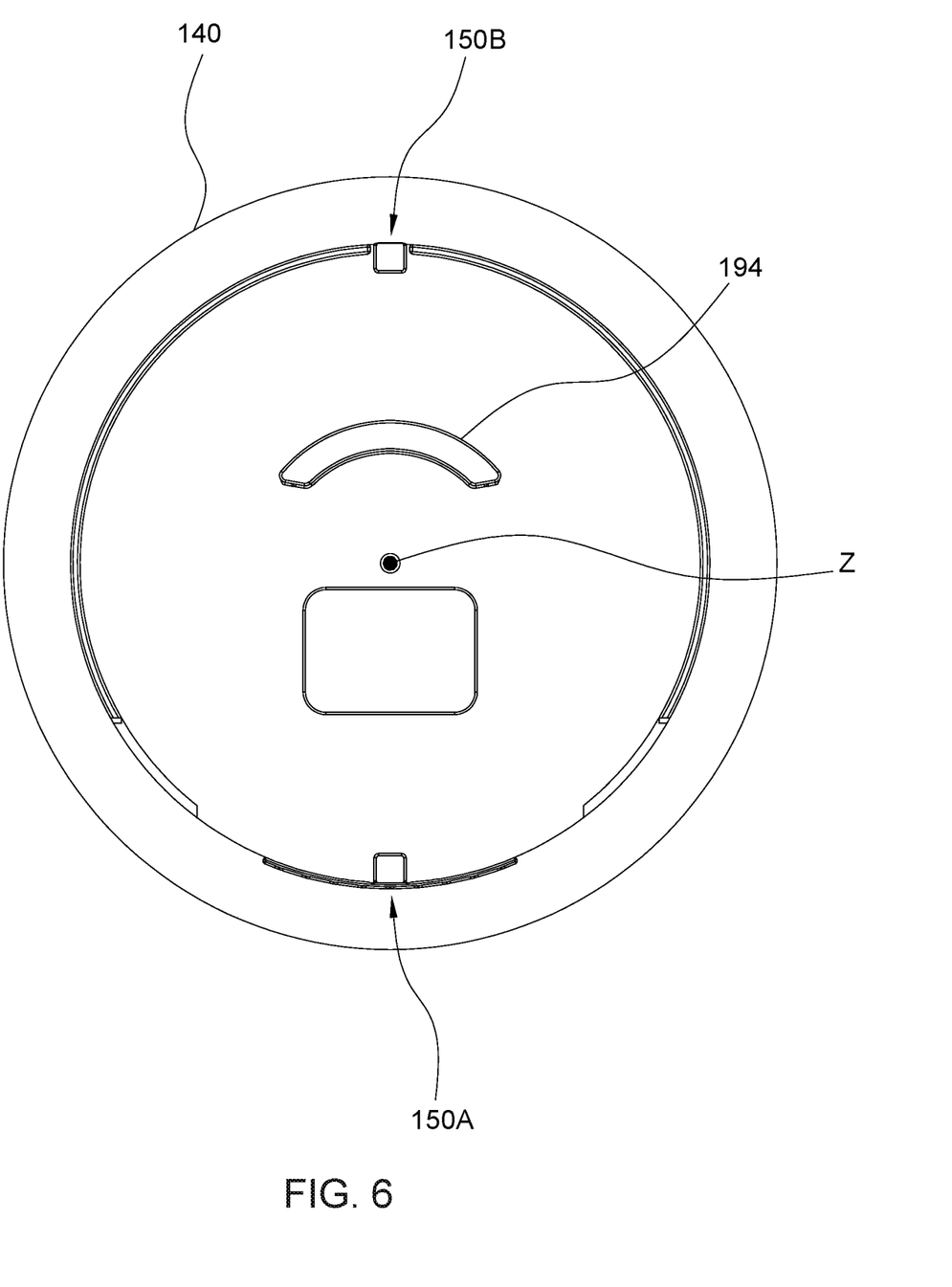
FIG. 6 is a schematic planar view illustrating an underside of a base plate provided in the rotary platform.

Construction details of the safety mechanism 190 can be better viewed in FIGS. 2, 3 and 6. Referring to FIGS. 2, 3 and 6, the safety mechanism 190 can include a stop 192 provided on the support base 102, and a follower part 194 coupled to the rotary platform 106 so that the follower part 194 is movable along with the rotary platform 106. The stop 192 can be a protrusion fixedly connected with the bearing portion 110 and disposed below the rotary platform 106. According to an implementation, the stop 102 may have an elongate shape. The follower part 194 may be an arcuate rib that is fixedly connected with the base plate 140 of the rotary platform 106 and protrudes at an underside of the rotary platform 106. The follower part 194 can be disposed eccentric from the pivot axis Z of the rotary platform 106. Accordingly, the follower part 194 can move with the rotary platform 106 along a circular travel path as the rotary platform 106 rotates about the pivot axis Z.

The safety mechanism 190 can be configured so that a rotational movement of the rotary platform 106 and the child seat 108 occurring while the sliding carriage 104 is located in a position other than the retracted position is limited by a contact between the follower part 194 and the stop 192 that keeps the rotary platform 106 and the child seat 108 apart from the forward facing position, and the stop 192 is located outside a travel path of the follower part 194 when the sliding carriage 104 is in the retracted position to allow rotation of the rotary platform 106 and the child seat 108 to the forward facing position.

Figure 8:
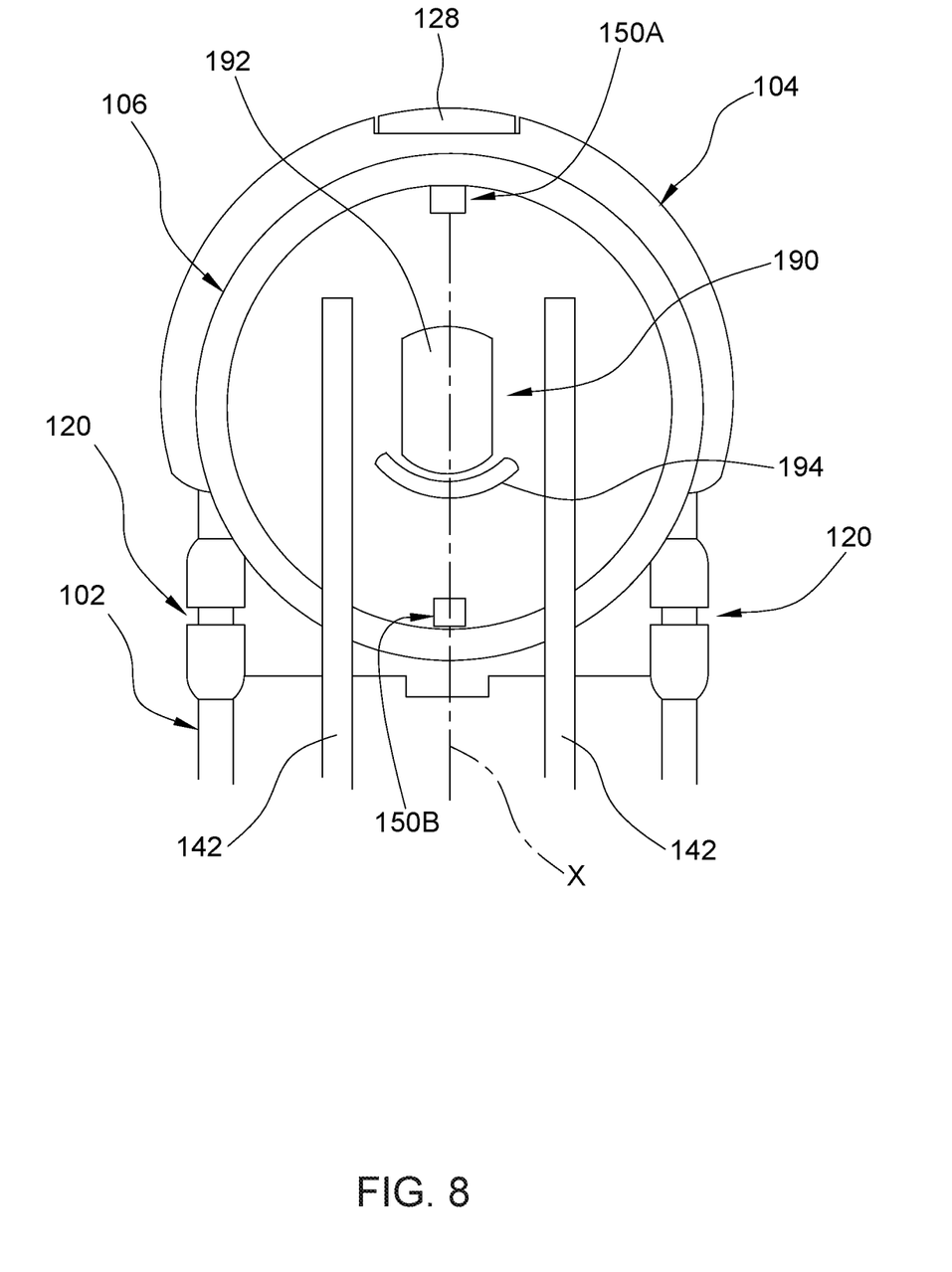
FIGS. 8-10 are schematic planar views illustrating exemplary operation of a safety mechanism operable to ensure proper configuration of the child safety seat for installation on a vehicle seat.

In conjunction with FIGS. 1-3 and 6, reference is made hereinafter to FIGS. 8-10 for describing exemplary operation of the safety mechanism 190. FIG. 8 is a schematic view illustrating a configuration where the sliding carriage 104 is in the retracted position and the rotary platform 106 and the child seat 108 are in the forward facing position. The follower part 194 can be located adjacently behind the stop 192 when the sliding carriage 104 is in the retracted position and the rotary platform 106 and the child seat 108 are in the forward facing position. This position of the follower part 194 relative to the stop 192 can prevent the sliding carriage 104 (and the rotary platform 106 and child seat 108 thereon) from sliding forward on the bearing portion 110.

When the child safety seat 100 needs to be switched from the configuration shown in FIG. 8 to another configuration, the release actuator 158 can be operated so that the latch 146 disengages from the rotary platform 106, which rotationally unlocks the rotary platform 106. While the sliding carriage 104 remains in the retracted position on the bearing portion 110 of the support base 102, the rotary platform 106 and the child seat 108 then can be rotated together relative to the support base 102 away from the forward facing position, which cause the flange portion 188 on the rotary platform 106 to disengage from the flange portion 187 of the anchoring portion 112. As a result, the follower part 194 can move away from its previous position behind the stop 192, which allows the sliding carriage 104 to slide forward relative to the support base 102. Subsequently, the release actuator 128 can be operated to cause the latch 126 to disengage from the bearing portion 110 of the support base 102, and the sliding carriage 104 thereby unlocked can then slide forward relative to the support base 102 to a desired position.

Figure 9:
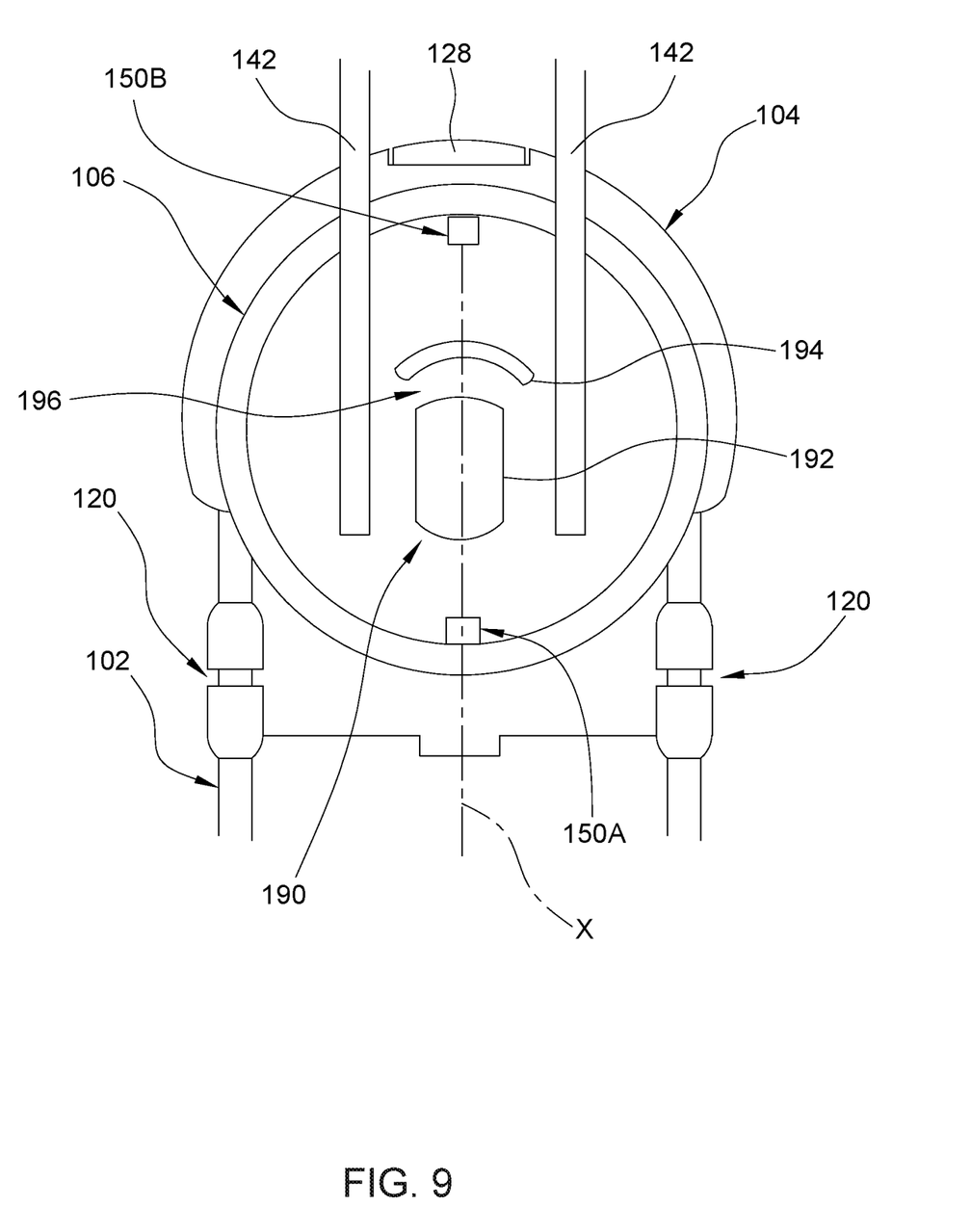

FIG. 9 illustrates a configuration where the sliding carriage 104 is in the extended position and the rotary platform 106 and the child seat 108 are in the rearward facing position. In the configuration shown in FIG. 9, the follower part 194 is located in front of the stop 192, and is spaced apart from the stop 192 by a clearance 196. The clearance 196 can allow a course of the sliding carriage 104 relative to the support base 102 between the extended position and the retracted position.

For switching the child safety seat 100 from the configuration shown in FIG. 9 to the configuration shown in FIG. 8, the sliding carriage 104 is first moved from the extended position to the retracted position with the rotary platform 106 and the child seat 108 remaining in the rearward facing position on the sliding carriage 104. Once the sliding carriage 104 is in the retracted position, the stop 192 is located outside a travel path of the follower part 194 and consequently will not interfere with a rotational displacement of the rotary platform 106. While the sliding carriage 104 remains in the retracted position, the rotary platform 106 and the child seat 108 can be rotated from the rearward facing position to the forward facing position. As the rotary platform 106 and the child seat 108 reach the forward facing position, the seat unit 145 can properly engage with the flange portion 186 of the anchoring portion 112. More specifically, the flange portion 188 on the rotary platform 106 can travel along with the rotary platform 106 and engage with the underside of the flange portion 187 on the anchoring portion 112, like previously described.

Figure 10:
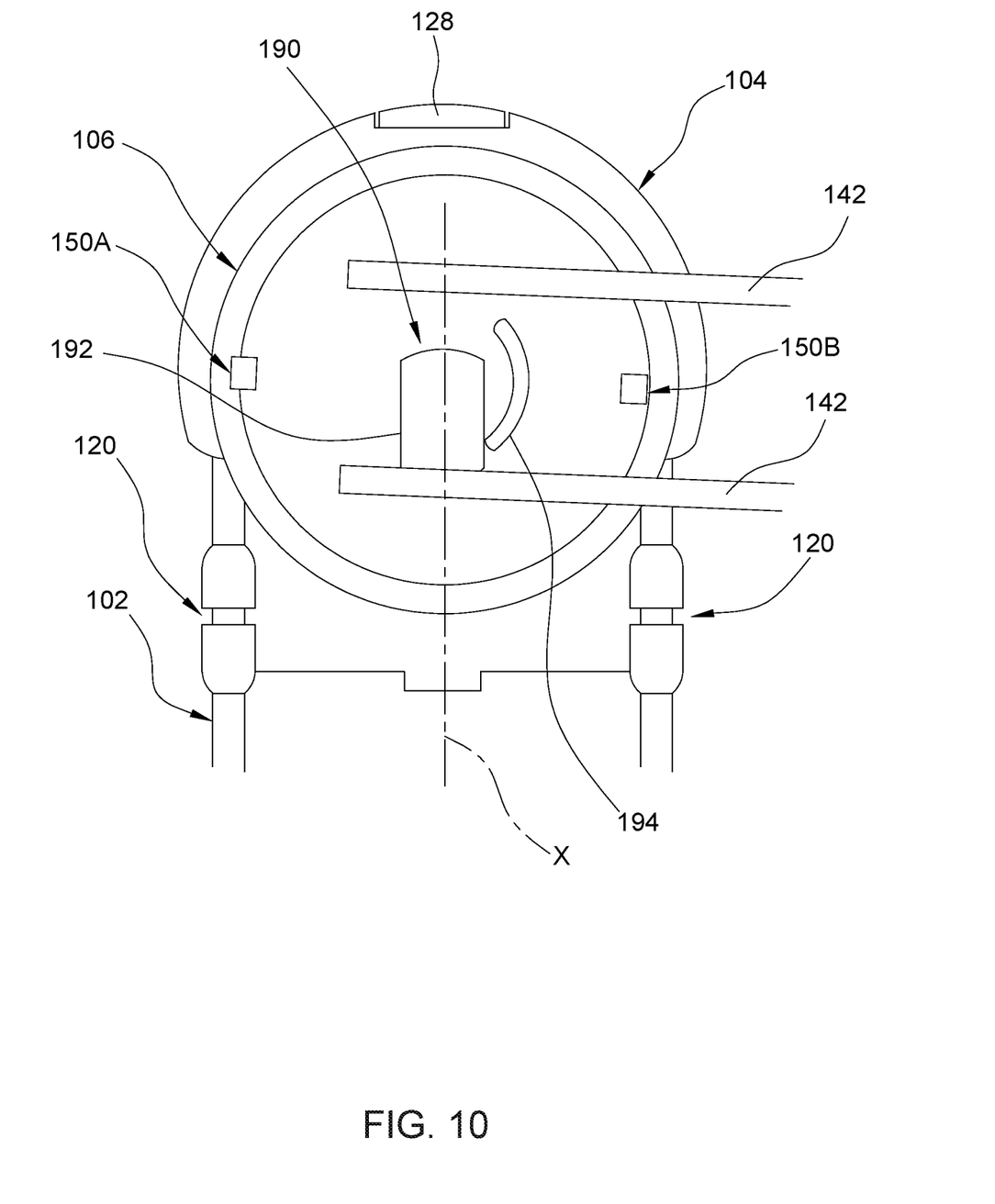

FIG. 10 is a schematic view illustrating a configuration where the rotary platform 106 and the child seat 108 are subjected to a rotational displacement while the sliding carriage 104 is in a position other than the retracted position on the bearing portion 110 of the support base 102. In this configuration, the stop 192 is located on a travel path of the follower part 194, and would interfere with a rotational movement of the rotary platform 106. If the rotary platform 106 and the child seat 108 were rotated while the sliding carriage 104 is not in the retracted position, the rotational movement of the rotary platform 106 and the child seat 108 would be limited by a contact between the follower part 194 and the stop 192, which can prevent the rotary platform 106 and the child seat 108 from reaching the forward facing position. This can ensure that whenever the rotary platform 106 and the child seat 108 are in the forward facing position, the seat unit 145 comprised of the rotary platform 106 and the child seat 108 is also properly engaged with the flange portion 187 of the anchoring portion 112.

Advantages of the child safety seat described herein include the ability to provide increased flexibility of adjustment for the child seat, so that the child safety seat can be disposed in a desirable configuration for installation in a rearward facing position or forward facing position. Moreover, the child safety seat can include a safety mechanism that can prevent erroneous configuration of the child safety seat when it is installed in the forward facing position, which can provide a safer use.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a support base suitable for placement on a vehicle seat, the support base having a stop;
   a sliding carriage connected with the support base, the sliding carriage being slidable relative to the support base between a retracted position and an extended position;
   a rotary platform, and a child seat disposed on the rotary platform, the rotary platform being pivotally connected with the sliding carriage, wherein the child seat and the rotary platform are rotatable together relative to the sliding carriage and the support base between a forward facing position and a rearward facing position, and the child seat, the rotary platform and the sliding carriage are slidable together relative to the support base; and
   a follower part coupled to the rotary platform so that the follower part is movable along with the rotary platform, wherein a rotational movement of the child seat and the rotary platform occurring while the sliding carriage is located in a position other than the retracted position is limited by a contact between the follower part and the stop that keeps the child seat and the rotary platform apart from the forward facing position, and the stop is located outside a travel path of the follower part when the sliding carriage is in the retracted position to allow rotation of the child seat and the rotary platform to the forward facing position.

2. The child safety seat according to claim 1, wherein the follower part is located adjacently behind the stop when the sliding carriage is in the retracted position and the child seat and the rotary platform are in the forward facing position.

3. The child safety seat according to claim 1, wherein the support base includes an anchoring portion and a bearing portion connected with each other, the anchoring portion having a belt path for passage of a fastening belt to attach the child safety seat on a vehicle seat, the sliding carriage being connected with the bearing portion; and wherein the child seat, the rotary platform and the sliding carriage being slidable together toward and away from the anchoring portion.

4. The child safety seat according to claim 3, wherein the follower part is fixedly connected with the rotary platform and protrudes at an underside of the rotary platform, and the stop is fixedly connected with the bearing portion.

5. The child safety seat according to claim 3, wherein the child seat and the rotary platform are rotatable together as a seat unit relative to the sliding carriage and the support base between the forward facing position and the rearward facing position, and the anchoring portion projects above the bearing portion and has a flange portion, the flange portion being located adjacent to a shoulder support region of the child seat and engaged with the seat unit when the sliding carriage is in the retracted position and the child seat and the rotary platform in the forward facing position, and the seat unit being disengaged from the flange portion in the rearward facing position.

6. The child safety seat according to claim 1, wherein the sliding carriage carries a first latch for rotationally locking the rotary platform and the child seat with respect to the sliding carriage, and a second latch for slidably locking the sliding carriage with respect to the support base.

7. The child safety seat according to claim 1, wherein the sliding carriage includes a latch operable to engage with and disengage from the rotary platform, the latch being engaged with the rotary platform for rotationally locking the rotary platform and the child seat in the forward facing position and the rearward facing position, the latch being disengaged from the rotary platform for rotation of the rotary platform and the child seat relative to the sliding carriage and the support base.

8. The child safety seat according to claim 7, wherein the sliding carriage further includes a release actuation mechanism that is coupled to the latch and includes a cable and a release actuator, the release actuator being operable to pull the cable and cause the latch to disengage from the rotary platform.

9. The child safety seat according to claim 8, wherein the latch is slidably assembled with a housing of the sliding carriage, and the release actuation mechanism further includes a driving member pivotally connected with the housing of the sliding carriage, the driving member being attached to an end of the cable and connected with the latch, whereby the release actuator is operable to pull on the cable and draw the driving member in rotation which in turn urges the latch to disengage from the rotary platform.

10. The child safety seat according to claim 9, wherein the rotary platform is rotatable relative to the sliding carriage and the support base about a pivot axis and has two locking holes disposed diametrically opposite relative to the pivot axis, and the latch is slidable substantially vertically relative to the housing of the sliding carriage to engage with and disengage from any of the two locking holes.

11. The child safety seat according to claim 8, wherein the latch is further connected with a spring, the spring biasing the latch for engagement with the rotary platform.

12. The child safety seat according to claim 1, wherein the sliding carriage includes a latch operable to engage with and disengage from the support base, and a release actuator operatively connected with the latch, the latch being engaged with the support base for slidably locking the sliding carriage with respect to the support base, and the release actuator being operable to cause the latch to disengage from the support base for sliding of the sliding carriage relative to the support base.

13. The child safety seat according to claim 12, wherein the latch is pivotally assembled with a housing of the sliding carriage, and is rotatable to engage with and disengage from any of a plurality of locking openings provided on the support base.

14. The child safety seat according to claim 13, wherein the release actuator is connected with the latch via a linking part and is exposed at a front of the sliding carriage for operation.

15. The child safety seat according to claim 1, wherein the child seat is slidably connected with the rotary platform, the child seat being slidable relative to the rotary platform and the support base for recline adjustment.

16. The child safety seat according to claim 15, wherein the child seat includes a recline lock movable between a locking and an unlocking state, the recline lock being engaged with the rotary platform in the locking state for locking the child seat in position with respect to the rotary platform, and the recline lock being disengaged from the rotary platform in the unlocking state for recline adjustment of the child seat relative to the rotary platform.

17. The child safety seat according to claim 16, wherein the recline lock is pivotally connected with a shell body of the child seat.

18. The child safety seat according to claim 17, wherein the child seat further including a release mechanism operable to urge the recline lock to move from the locking state to the unlocking state, the release mechanism including a first and a second release actuator respectively exposed at a front and a rear of the child seat and operatively connected with the recline lock, each of the first and second release actuator being independently operable to cause the recline lock to rotate from the locking state to the unlocking state.

19. The child safety seat according to claim 18, wherein the first release actuator is connected with the recline lock via a first linking part, the first linking part having a first end pivotally connected with the first release actuator and a second end slidably connected with the recline lock.

20. The child safety seat according to claim 18, wherein the second release actuator is connected with the recline lock via a second linking part, the second linking part having a first end connected with the second release actuator and a second end having a ramp disposed adjacent to the recline lock, the second release actuator being operable to draw the second linking part in movement, which urges the recline lock to rotate to the unlocking state via a sliding contact between the recline lock and the ramp.

* * * * *